United States Patent
Fitz et al.

[19]

[11] Patent Number: 6,042,194
[45] Date of Patent: Mar. 28, 2000

[54] WHEEL SUPPORT ASSEMBLY AND METHOD

[75] Inventors: Frank A Fitz, Poway; Craig T. Gadd, San Diego; Wayne K. Higashi, Los Gatos, all of Calif.

[73] Assignee: Kuhl Wheels, LLC, Los Gatos, Calif.

[21] Appl. No.: 09/098,164

[22] Filed: Jun. 16, 1998

[51] Int. Cl.⁷ .................................................. B60B 1/00
[52] U.S. Cl. .......................... 301/80; 301/64.1; 301/104; 29/894.34; 29/894.344
[58] Field of Search ................... 301/9.1, 35.54, 301/64.1, 79, 80, 84, 104, 105.1; 29/894.32, 894.34, 894.344

[56] References Cited

U.S. PATENT DOCUMENTS

| | | |
|---|---|---|
| 47,480 | 5/1865 | Murphy . |
| 160,268 | 3/1875 | Hodges . |
| 161,223 | 3/1875 | Griffin . |
| D. 243,169 | 1/1977 | Suzuki et al. . |
| D. 245,775 | 9/1977 | Muth . |
| D. 248,095 | 6/1978 | Shuzuki et al. . |
| D. 256,453 | 8/1980 | DeGraaff . |
| D. 259,195 | 5/1981 | Smith . |
| D. 268,260 | 3/1983 | Kerschbaum et al. . |
| D. 274,902 | 7/1984 | Ito . |
| D. 282,924 | 3/1986 | Inoue . |
| D. 290,946 | 7/1987 | Bruder . |
| 1,081,844 | 12/1913 | Laurencich . |
| 1,105,646 | 8/1914 | Goodyear . |
| 1,134,674 | 4/1915 | Ellis . |
| 1,340,220 | 5/1920 | Foster et al. . |
| 1,365,181 | 1/1921 | Marzak et al. . |
| 1,410,045 | 3/1922 | Williams ................... 301/80 |
| 1,414,013 | 4/1922 | Foster . |
| 1,473,283 | 11/1923 | Cromwell . |
| 1,548,230 | 8/1925 | Wade . |
| 1,559,673 | 11/1925 | Carnahan ................... 301/80 |
| 1,635,490 | 7/1927 | Meldrum ................... 301/65 |
| 1,701,325 | 2/1929 | Hahner . |
| 1,706,327 | 3/1929 | Sims . |
| 1,710,058 | 4/1929 | Jernberg ............... 301/64.1 X |
| 1,737,935 | 12/1929 | Meldrum ............... 301/104 X |
| 2,047,137 | 7/1936 | Eksergian ............. 301/64.1 X |
| 2,137,288 | 11/1938 | Horn . |
| 2,206,230 | 6/1940 | Maccabee . |
| 2,523,756 | 9/1950 | Frank . |
| 2,890,911 | 4/1959 | Schilberg ............. 301/104 X |
| 3,465,804 | 9/1969 | Dupre . |
| 3,917,352 | 11/1975 | Gageby . |
| 3,950,033 | 4/1976 | Wilcox .................. 301/66 X |
| 4,153,267 | 5/1979 | Hilber . |
| 4,256,346 | 3/1981 | Kawaguchi et al. .......... 301/66 X |
| 4,511,184 | 4/1985 | Schauf et al. . |
| 5,417,305 | 5/1995 | Parker . |
| 5,564,793 | 10/1996 | Whiteford . |
| 5,707,114 | 1/1998 | Sclanger . |

FOREIGN PATENT DOCUMENTS

| | | |
|---|---|---|
| 366221 | 9/1906 | France . |
| 507112 | 9/1920 | France . |
| 525584 | 9/1921 | France . |
| 871788 | 5/1942 | France . |
| 891283 | 2/1943 | France .................... 301/73 |
| 891283 | 3/1944 | France . |
| 2676397 | 11/1992 | France . |
| 202614 | 10/1908 | Germany . |
| 331554 | 1/1918 | Germany ................ 301/35.54 |
| 633369 | 7/1936 | Germany ................ 301/64.1 |
| 803743 | 4/1951 | Germany . |
| 198440 | 6/1923 | United Kingdom . |

*Primary Examiner*—Russell D. Stormer
*Attorney, Agent, or Firm*—Stephen C. Swear

[57] ABSTRACT

A method of making a wheel support assembly adapted to bolt to an axle of a vehicle for supporting a tire is disclosed herein along with the assembly itself. In accordance with this method, an outer annular rim having an outer annular surface configured to support a tire is provided along with at least one integral piece of sheet metal. The sheet metal is stamp formed into a plurality of spoke arrangements, each of which includes (i) at least two elongated spokes respectively including inner ends and outer ends and (ii) a cross-bar connecting together the inner ends of the spokes and configured to bolt to the axle for connecting the inner ends of the spokes to the axle, whereby to serve as part of a hub of the wheel support assembly. The outer ends of the spokes are connected to the rim. In one embodiment disclosed herein, each spoke arrangement is formed from its own separate and distinct piece of sheet metal. In a second embodiment, all of the spoke arrangements are stamp formed from a single piece of sheet metal.

7 Claims, 6 Drawing Sheets

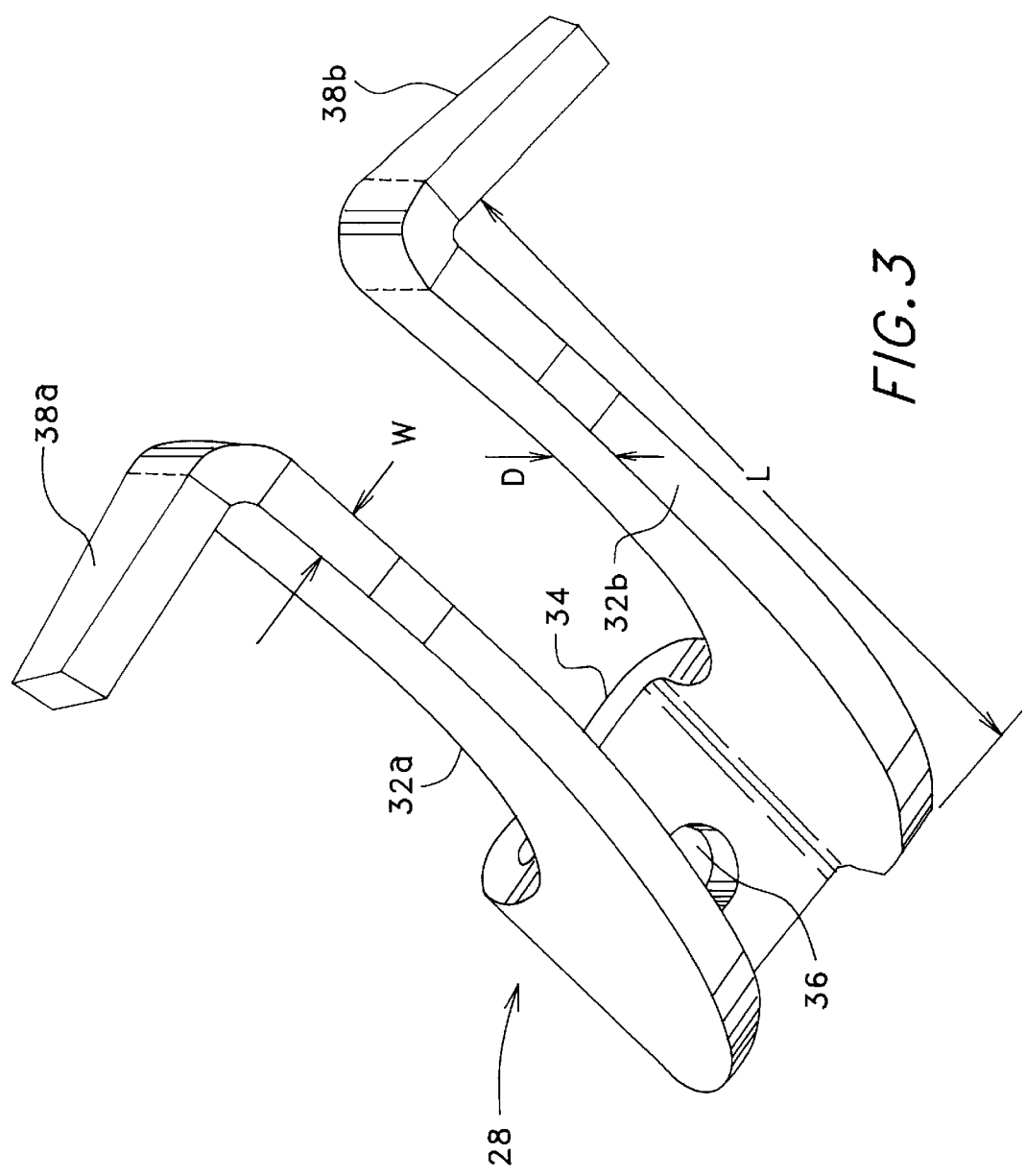
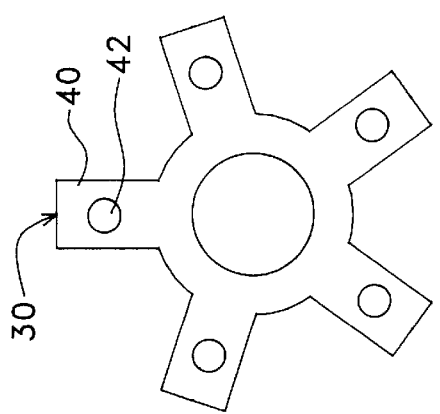

WHEEL SUPPORT ASSEMBLY AND METHOD

BACKGROUND OF THE INVENTION

The present invention relates generally to wheel support assemblies for vehicular tires and more particularly to a specifically designed wheel support assembly and its method of manufacture.

There is disclosed in co-pending Braunschweiler U.S. patent application Ser. No. 09/053,439 filed Apr. 1, 1998 a wheel support assembly or structure which has a number of benefits, as recited therein. The present wheel support assembly is believed to be in many respects an improvement to the assembly disclosed in this co-pending application, the latter of which is incorporated herein by reference. In particular, while the earlier assembly has certain structural and/or economic advantages over prior art wheel support assemblies, the present wheel assembly design has the same advantages and, in addition, it is believed that the present design is easier and more economical to manufacture than the earlier design, as will be seen hereinafter.

SUMMARY OF THE INVENTION

As will be described in more detail hereinafter, there is disclosed herein a wheel support assembly designed in accordance with the present invention and a method of making the wheel support assembly, also in accordance with the present invention. The wheel assembly is adapted to bolt to an axle of a vehicle for supporting a tire. In accordance with its method of manufacture, an outer annular rim having an outer annular surface configured to support a tire is provided along with at least one integral piece of sheet metal. The rim is manufactured in any suitable manner. The sheet metal is formed by means of stamping, cutting, folding and/or bending (hereinafter "stamp formed") into a plurality of spoke arrangements, each of which includes (i) at least two elongated spokes respectively including inner ends and outer ends and (ii) an integral cross-bar connecting together the inner ends of the spokes and configured to bolt to the end of the axle for connecting the inner ends of said spokes to the axle, whereby to serve as part of a hub of the wheel support assembly. The outer ends of the spokes are connected to the rim.

In one embodiment disclosed herein, each spoke arrangement is formed from its own separate and distinct piece of sheet metal. In a second embodiment, all of the spoke arrangements are stamp formed from a single piece of sheet metal. Other features of the wheel support assembly itself and its method of manufacture will be described in more detail hereinafter.

DESCRIPTION OF THE DRAWINGS

The various aspects of the present invention, as summarily recited above, will be described in more detail hereinafter in conjunction with the drawings, wherein:

FIG. 2a is a diagrammatic plan view of a component of the assembly of FIG. 2, specifically a component for connecting together an array of spoke arrangements;

FIG. 3 is a diagrammatic perspective view of one of a number of spoke arrangements forming part of the wheel assembly illustrated in FIG. 2;

DETAILED DESCRIPTION

Figure 1:
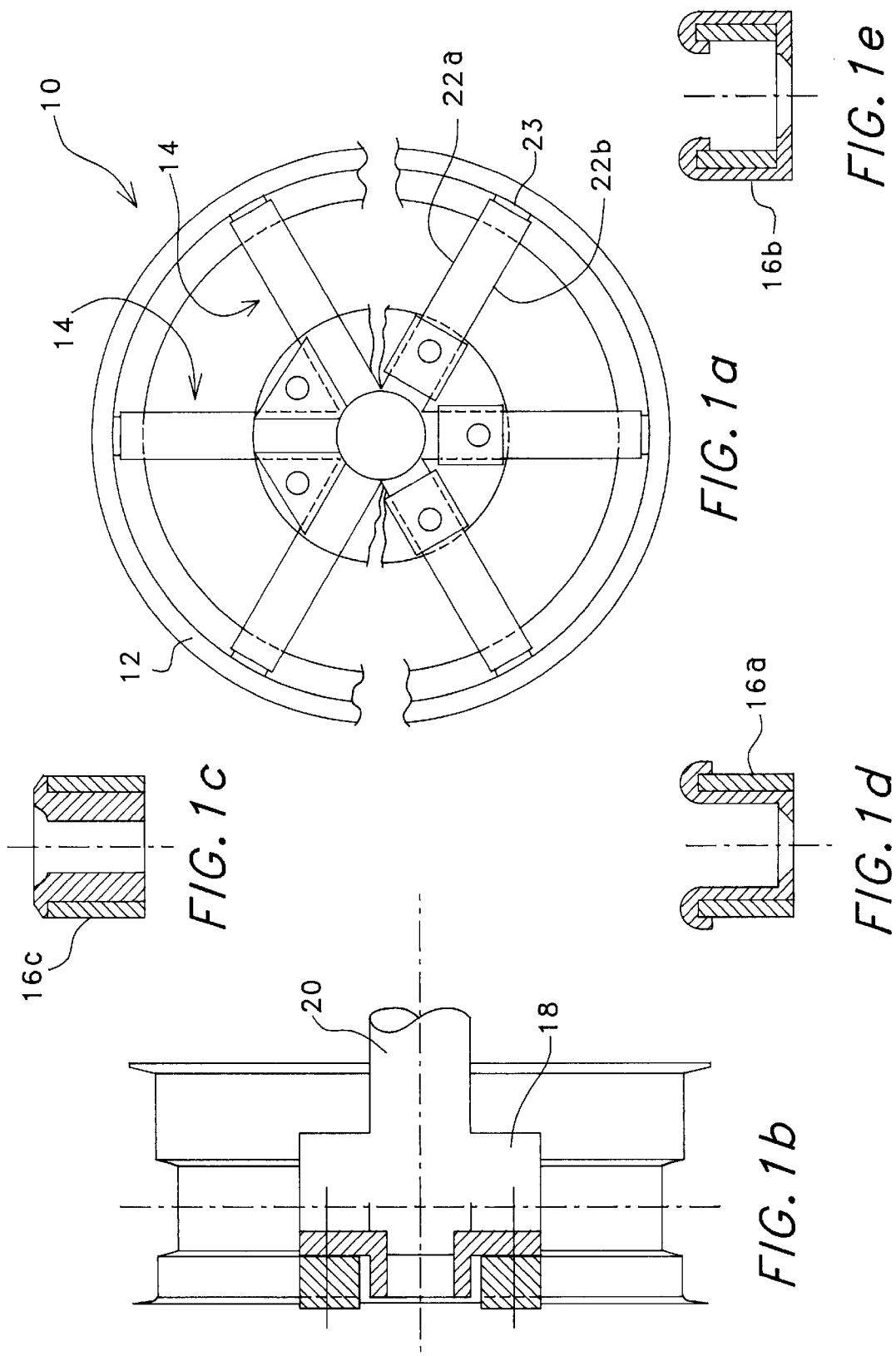
FIGS. 1a–1e diagrammatically illustrate a wheel support assembly or structure disclosed in the above-recited co-pending Braunschweiler patent application.

Turning now to the drawings, wherein like components are designated by like reference numerals throughout the various figures, attention is first directed to FIG. 1 which, as stated above illustrates a wheel assembly or structure 10 disclosed in the co-pending Braunschweiler patent application and shown specifically in FIGS. 11a–11e in that application. For a detailed discussion of this assembly and its attributes, reference is made to the co-pending application which, as stated above is incorporated by reference. Nevertheless, for the convenience of the reader, wheel assembly 10 (which is numbered differently here than in the co-pending application) will be discussed briefly below.

As shown best in FIGS. 1a and 1b, wheel assembly 10 includes a rim 12 having inner and outer circumferential surfaces, a plurality of spoke arrangements 14 and a clip mechanism 16a or 16b or 16c for each of the spoke arrangements. As will be discussed below, each spoke arrangement is disposed within the rim 12 and is welded or otherwise suitably fixedly attached at its radially outer end to the inner circumferential surface of rim 12 which is configured to support a vehicle tire on its outer surface. The radially inner end of each spoke arrangement is designed to bolt to the hub connecting end 18 of an axle 20 (see FIG. 1b) of a vehicle (not shown) with the aid of a cooperating clip mechanism 16a or 16b or 16c. The radially inward ends of the spoke arrangements and their cooperating clip mechanism together serve as a hub for the overall wheel assembly 10.

As seen best in FIG. 1a, each spoke arrangement includes two spokes 22a and 22b which are joined together at their radially outer ends by a cross bar 23 which fixedly connects, for example by means of a weld, to rim 12. The radially inner ends of the two spokes are free to receive a cooperating clip mechanism 16a or 16b or 16c as illustrated best in FIGS. 1d and 1e. Each clip mechanism is bolted to hub connecting end 18 such that neither spoke of any of the arrangements extends along a radius of rim 12. Rather, each spoke pair making up a spoke arrangement straddles, that is, extends parallel to and on opposite sides of, a give radius of the rim which means it also straddles the axis of rotation of the rim.

Figure 2:
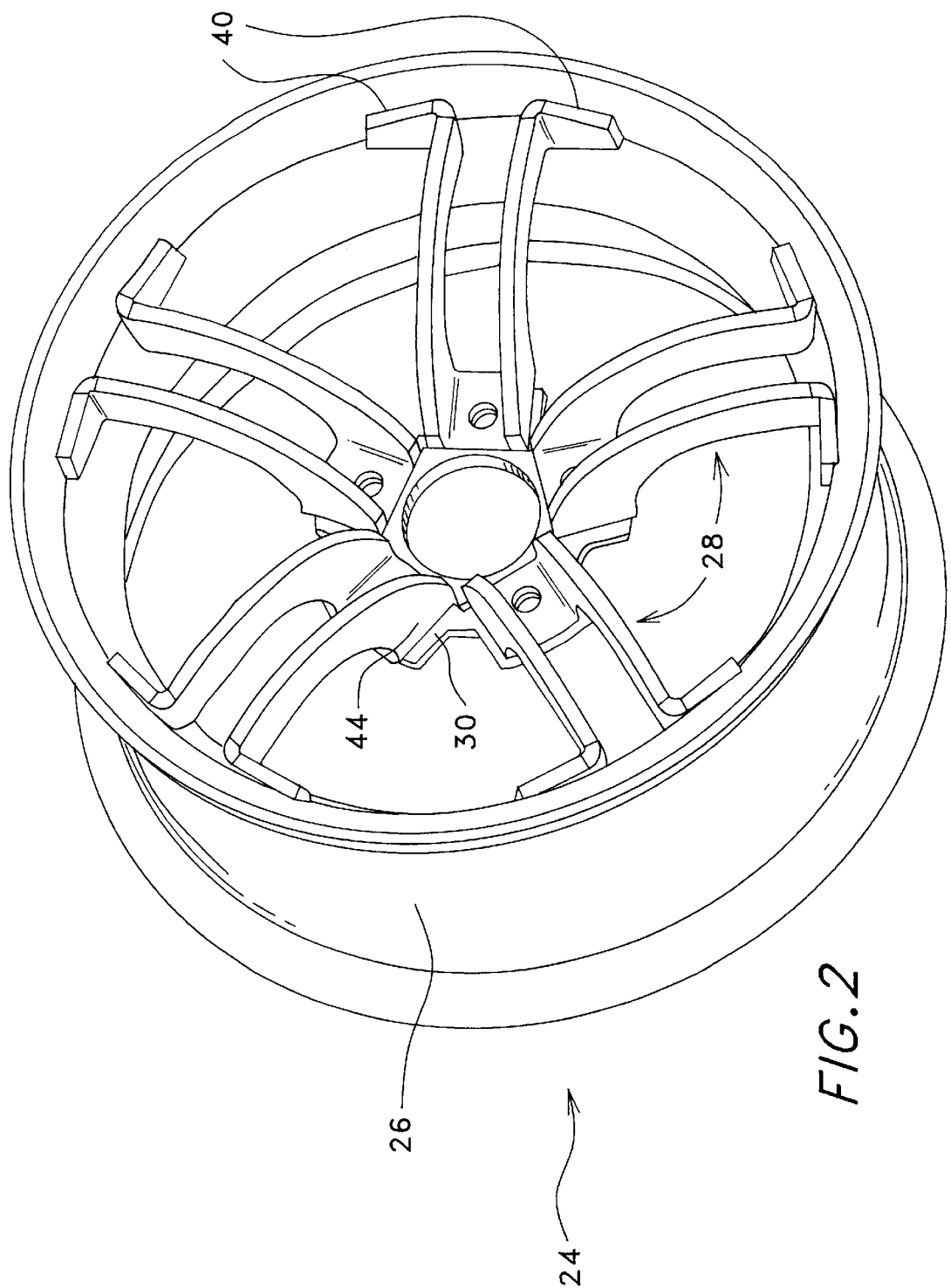
FIG. 2 illustrates in diagrammatic perspective view a wheel support assembly or structure designed in accordance with one embodiment of the present invention.

Turning now to FIGS. 2 and 3, attention is directed to a wheel support assembly or structure 24 which is designed in accordance with a first embodiment of the present invention. In many respects, this particular assembly is similar to the assembly 10. For example, as seen in FIG. 2, wheel assembly 24 includes a rim 26 having inner and outer circumferential surfaces and a plurality of spoke arrangements 28. Unlike, wheel assembly 10, assembly 24 does not include clip mechanisms corresponding to clip mechanism 16a or 16b or 16c for each of the spoke arrangements.

As will be discussed below, each spoke arrangement 28 is disposed within the rim 26 and is welded or otherwise suitably fixedly attached in the manner to be described at its radially outer end to the inner circumferential surface of rim 26 which, like rim 12, is configured to support a vehicle tire on its outer surface. The radially inner end of each spoke arrangement is also designed to bolt to the hub connecting end 18 of axle 20 (see FIG. 1b) of a vehicle (not shown), but without the aid of individual clip mechanisms 16a or 16b or 16c. Rather, as will be seen, the radially inner ends of each spoke arrangement are specifically configured in accordance with the present invention to bolt directly to hub connecting end 18 of axle 20, either alone or with a common connector 30 shared by all of the spoke arrangements, as shown in FIG. 2 and as seen separately in FIG. 2a.

As seen best in FIG. 3, each spoke arrangement 28 is an integrally formed unit which includes two spokes 32a and 32b joined together at their radially inner ends by a cross bar 34 containing a bolt receiving through-hole 36. The radially outer ends of the two spokes join flanges 38a and 38b which turn laterally outward from the spokes to conform with the curvature of the rim.

Returning to FIG. 2 in conjunction with FIG. 1, note that each spoke arrangement is configured such that its turned out flanges 38a and 38b serve as foot rests or anchors against the inner circumferential surface of rim 26 to which the flanges are fixedly connected, preferably by means of welding as generally indicated at 40. At the same time, cross-bar 34 extends laterally across spokes 32a and 32b so as to present a resting surface against connecting end 18 of axle 20 such that its through-hole is in alignment with a threaded stud or a bolt hole (for receiving the shaft of a cooperating bolt, not shown) forming part of connecting end 18. In this way, all of the spoke arrangements 28, five in all in the embodiment shown, can be directly bolted to connecting end 18 of axle 20. In this latter regard, while the various spoke arrangements can be bolted in place without further components forming part of the overall wheel support assembly, the latter may include separate common connector 30 which is shown best in FIG. 2a, as stated above. As seen there, connector 30 is spider shaped including one arm 40 for each spoke arrangement, each arm including a through-hole 42. As seen in FIG. 2, the connector 30 is positioned against the cross-bars 34 of the various spoke arrangement 28 such that through-holes 42 align with through-holes 36 and is fixedly attached to the spoke arrangements in this position, preferably by means of welding, as indicated at 44. In this way, the star shaped connector serves to interconnect together all of the spoke arrangements and, at the same time, accommodates the bolt shafts of the connecting end 18 of axle 20.

With the spoke arrangements 28 fixedly connected with rim 26 in the manner discussed above and shown in FIG. 2, with or without the use of star shaped connector 30, certain things should be noted. First, it should be noted that each spoke 32a and 32b making up each spoke arrangement 28 has a length L that preferably is longer than it is wide, that is longer than its width W, while its depth D is always substantially deeper than the spoke is wide. In an actual embodiment, each spoke is 5 inches long, 0.3 inch wide and 1.55 inches deep. Second, it should be noted that the spokes 32a, 32b of each pair, extend inward from rim 26 on either side but not along a radius of rim 26. Rather, they straddle a common radius, preferably in approximate parallel relationship with the latter and, at the same time, they straddle the axis of rotation of the rim. This is important for the following reasons. Spokes displaced from a radial line carry wheel torque loads as tensile stress. This is beneficial because the spokes are very strong in tension. If spokes were located on a radius, torque loads would be carried as bending stress on the spokes. The spokes are very weak in bending in the circumferential (wheel torque) direction.

In accordance with an important aspect of the present invention, each of the spoke arrangements 28 is integrally formed from sheet metal using a conventional sheet metal stamping process. This is also true for star shaped connector 30. Thus, as illustrated by means of a flow diagram in FIG. 7, sheet metal of the appropriate size is provided, as indicated by step 46. By sheet metal is meant any metal which is suitable structurally for its intended purpose as part of the wheel support assembly and which can be readily formed into the desired shape by means of a conventional sheet metal stamping process. What is meant by conventional sheet metal stamping process is the use of appropriate equipment to cut, stamp, fold and/or bend the sheet metal into the desired shape depending on which of these operations or combinations thereof is appropriate for the desired shape.

Once the sheet metal is provided, it is formed into the desired shape using the conventional equipment mentioned above, as indicated in steps 48 and 49. In this regard, note that the particular spoke arrangement 28 illustrated in FIG. 3 is initially formed from sheet metal having a thickness equal to the width W of the spokes 32a and 32b. It starts out entirely flat, having been cut or stamped from the sheet metal into a generally planar, generally U-shaped blank. The legs of this U-shaped blank will serve as both the spokes and its flanges and the connecting section of the U-shape will serve as the cross-bar. To this end, the connecting section is stamped away from the legs and the latter are bent around so that the depth D of the spokes extend normal to the face of the connecting section which is now in position to function as the cross-bar 34. Thereafter, the legs of the U-shape are bent outward to produce flanges 38a and 38b, as distinguished from spokes 32a and 32b. At some appropriate point in this operation, the through-hole 36 is provided by either a punching or drilling operation.

In the case of star shaped connector 30, the particular shape shown requires less complex stamping, cutting, folding and/or bending and drilling operations than each spoke arrangement. However, it can be made from the same piece of sheet metal as the spoke arrangement just described and, in fact, if the piece of sheet metal provided is large enough, all of the spoke arrangements can be made from the same piece. On the other hand, it is to be understood that the present invention is not limited to the particular piece of sheet metal used, nor is it limited to the particular shape of either the spoke arrangement or connector shown in FIGS. 2, 2a and 3. It is to be further understood that the stamping, cutting, folding, bending, drilling operations can take place in any suitable combination and order depending upon the ultimate desired shape.

Once spoke arrangements 28 and star shaped connector 30 are formed pursuant to steps 48 and 50, they are welded or otherwise fixedly connected together (assuming connector 30 is used) and welded or otherwise fixedly connected with rim 26 in accordance with step 52 in the overall method of making wheel support assembly 24.

Figure 4:
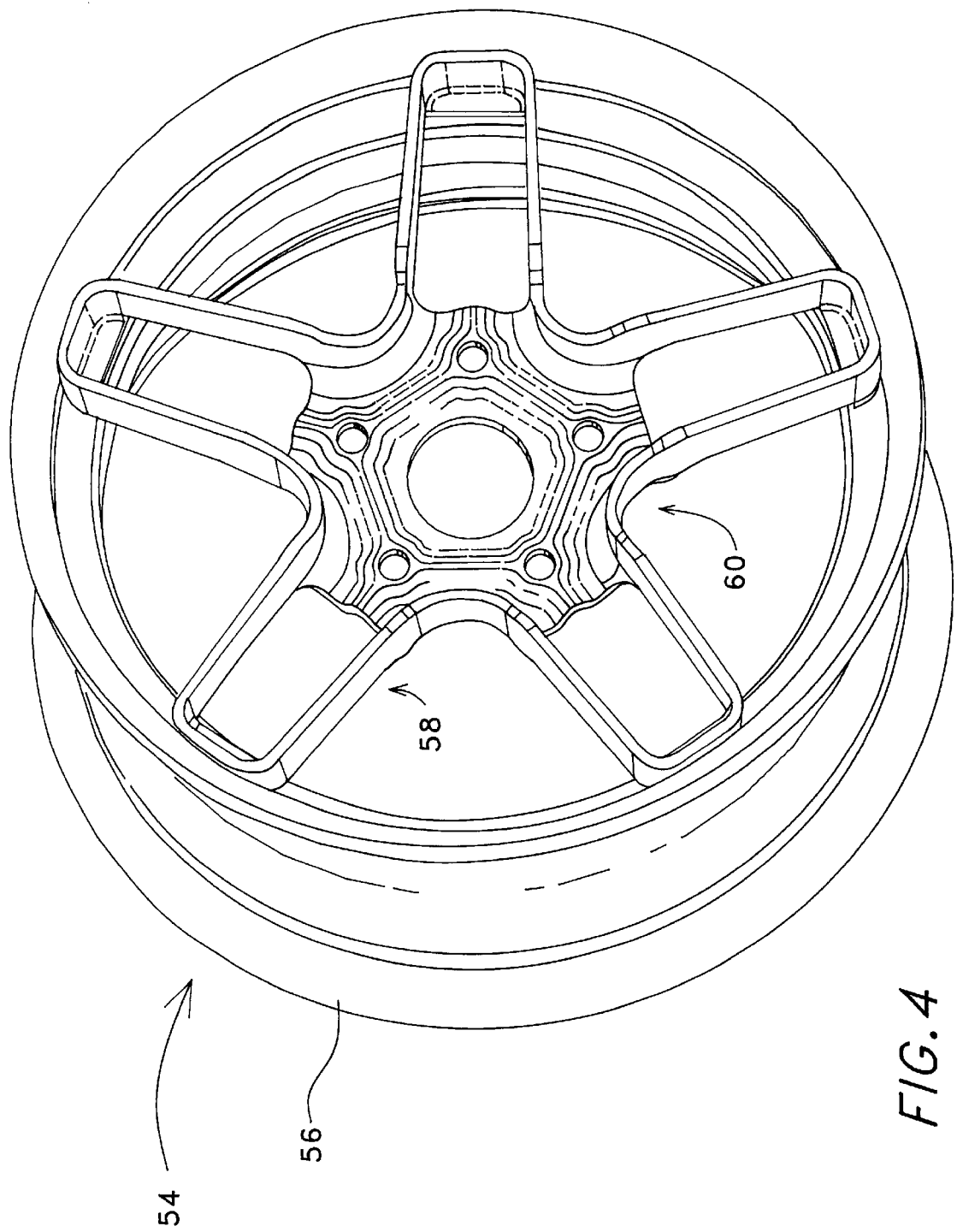
FIG. 4 illustrates in diagrammatic perspective view a wheel support assembly or structure designed in accordance with a second embodiment of the present invention.
Figure 5:
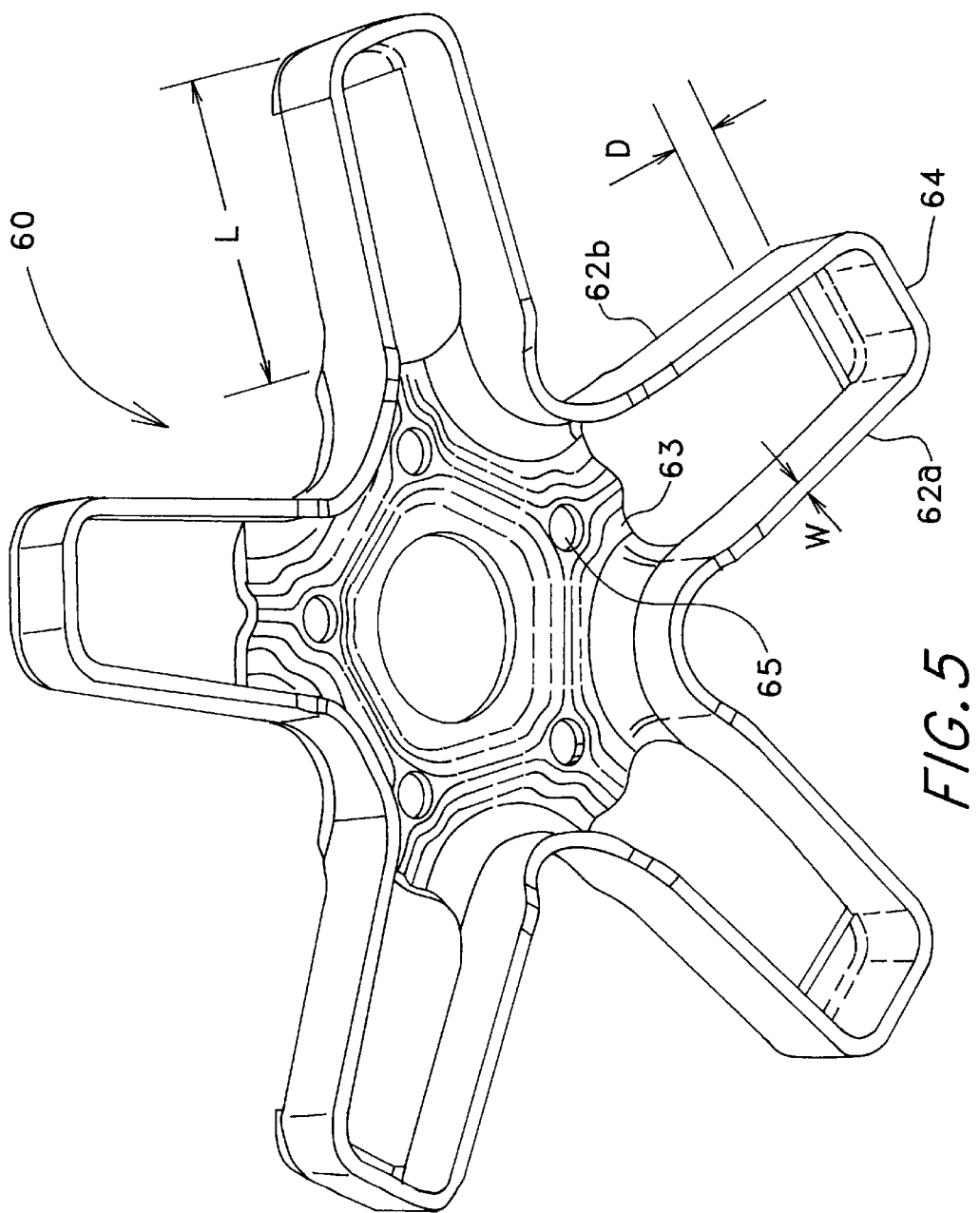
FIG. 5 is a diagrammatic perspective view of an integral spoke array forming part of the wheel assembly illustrated in FIG. 4.

Having discussed wheel support assembly 24 and its method of manufacture, attention is now directed to FIGS. 4 and 5 and a discussion of a wheel support assembly designed in accordance with a second embodiment of the present invention. This wheel support assembly, generally indicated at 54 in FIG. 4, like assembly 24 includes a rim 56 and a plurality, specifically five, spoke arrangements 58 arranged within rim 56 in the manner illustrated in FIG. 4, that is, in the same manner as assembly 24. Rim 56 may be identical to rim 26. The spoke arrangements, unlike spoke arrangements 28, are integrally formed as a single unit 60 from sheet metal, although this single unit is formed in the same manner as the individual spoke arrangements 28, that is, in the manner described above with respect to FIG. 7. This formation process will be discussed hereinafter.

As stated immediately above, unit 60 is integrally comprised of five spoke arrangements 58. Each arrangement 58 is similar in most respects to the previously described spoke arrangements 28. That is, each arrangement 58 includes two spokes 62a and 62b having inner ends joined to one another by a cross-bar 63 having a through-hole 65 corresponding in function to previously described through-holes 36. In the case of unit 60, all five cross-bars 63 integrally form part of unit 60 and serve as a center hub for the overall wheel support assembly. This center hub is designed to bolt to the connecting end 18 of axle 20 using through-holes 65 in the same manner as assembly 24. The outer ends of each spoke pair 62a and 62b are joined by a common cross-bar or flange 64 which, like flanges 38a and 38b, serves as a foot rest against the inner circumferential surface of rim 56 and is welded or otherwise suitably fixedly connected with the rim.

Referring specifically to FIG. 5, it is to be noted that each spoke 62a and 62b includes the same length L, width W and depth D relationship as spokes 32a and 32b. That is, each spoke 62a and 62b is, in the embodiment illustrated, substantially longer than it is wide and substantially deeper than it is wide. In fact, in the embodiment illustrated, the same piece of sheet metal used to make the spoke arrangements of assembly 24, that is sheet metal having a thickness W, is used to make integral unit or center hub 60. Also, it should be noted that each spoke pair 62a, 62b straddles a radius of rim 54 and the rim's rotation axis in the same manner as spoke pairs 32a, 32b.

Figure 7:
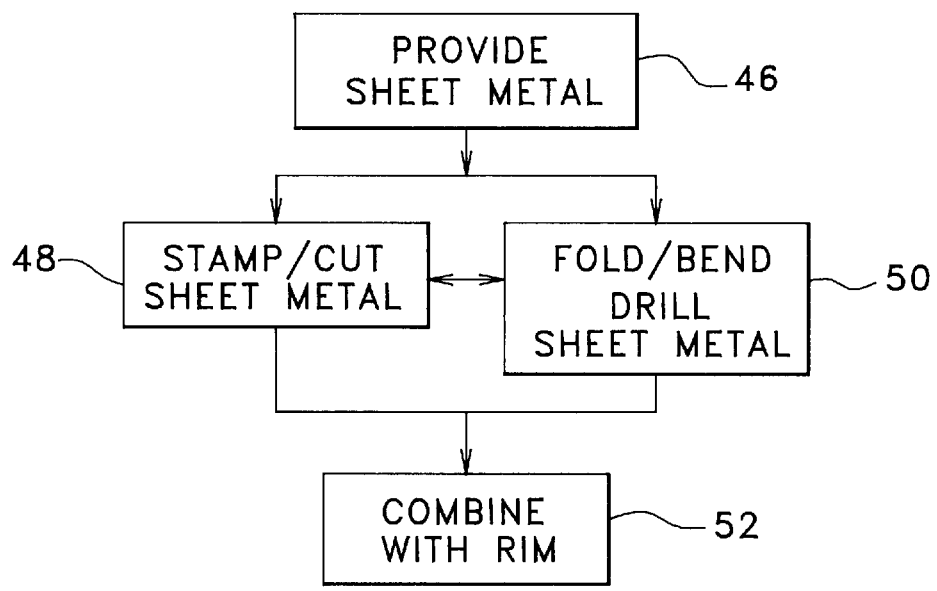
FIG. 7 is a block diagram or flow chart generally illustrating a method of making either of the wheel assemblies of FIGS. 2 or 4 in accordance with the present invention.

Referring to FIG. 7 in conjunction with FIG. 5, it should be noted that integral unit 60 is made in the same way as each of the previously described spoke arrangements 28. Thus, unit 60 starts as a single piece of sheet metal which is cut out into a star shaped blank which may or may not have a center hole. This blank is then stamped/cut/folded/bent to form the center hub of inner cross-bars 63, the individual spokes 62a and 62b and outer cross-bars or flanges 64. Also sometime in this process the through-holes 65 are punched or drilled out.

In both the case of wheel support assembly 24 and assembly 54, five spoke arrangements were used. This is because there are often five tire bolt connections to a standard automobile axle. It is to be understood that the present invention is not limited to five such arrangements. In the same manner, the present invention is not limited to spoke pairs or spokes that are substantially longer than they are wide. However, as in the case of the wheel support assembly described in the co-pending Braunschweiler application, there are distinct structural advantages to having spoke pairs in the straddling relationship described and having spokes that are substantially deeper than they are wide.

Figure 6:
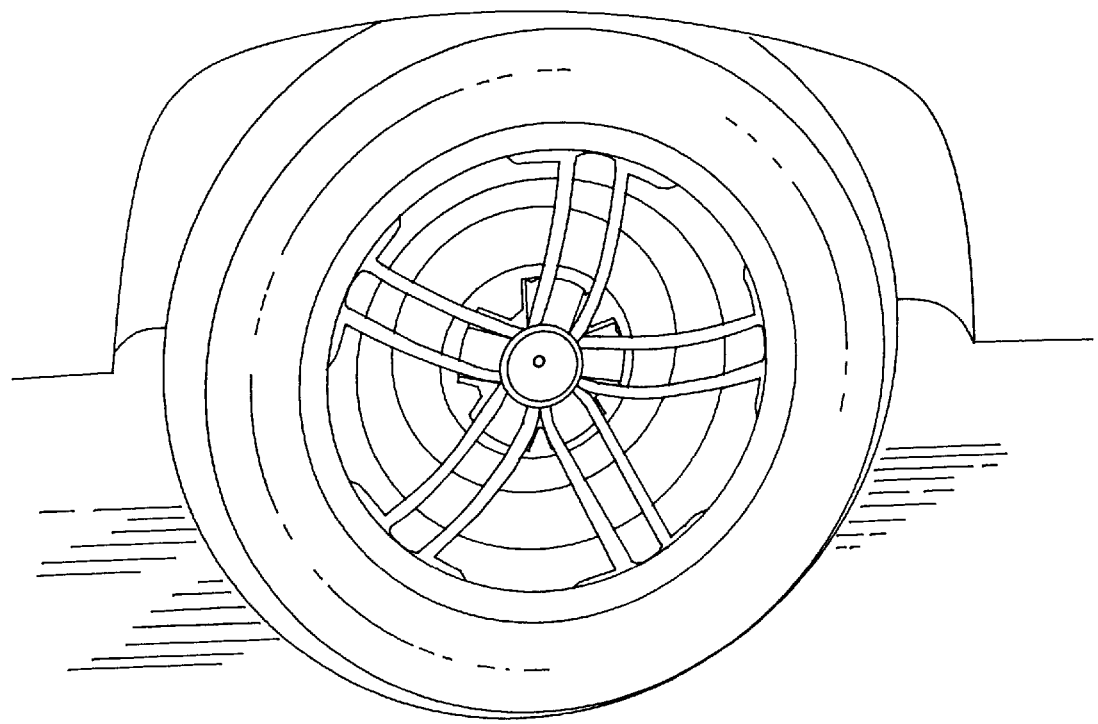
FIG. 6 is a perspective view of an actual wheel assembly corresponding to the wheel assembly illustrated diagrammatically in FIG. 2 and shown bolted to the axle of an automobile and supporting a tire.

Referring now to FIG. 6 an actual prototype 24' of assembly 24 is shown mounted to an automobile and supporting an automobile tire.

What is claimed is:

1. A wheel support assembly adapted to bolt to an axle of a vehicle for supporting a tire, said assembly comprising:

(a) an outer annular rim having an outer annular surface configured to support a tire and an inner annular surface;

(b) a plurality of spoke arrangements, each of which includes (i) at least two elongated spokes respectively including inner ends and outer ends and (ii) a cross-bar connecting together the inner ends of the spokes and configured to bolt to said axle for connecting the inner ends of said spokes to said axle, whereby said cross-bar serves as part of a hub of said wheel support assembly, all of said spokes and said cross-bars making up the wheel support assembly being integrally stamp formed into a single unit from a single piece of sheet metal, said single unit serving as the only strength imparting structure between said rim and the hub; and (c) means for connecting the outer ends of said spokes to said rim.

2. An assembly according to claim 1 wherein all of the spokes of said spoke arrangements extend inwardly from said rim along a path which does not coincide with a radius of said rim.

3. An assembly according to claim 2 wherein each spoke arrangement includes only a pair of spokes and wherein each of the spokes of each pair extends inwardly and on opposite sides of a particular radius of said rim.

4. An assembly according to claim 3 wherein each spoke has a generally rectangular cross-section defined by front and back edges and opposing side walls, the latter extending approximately parallel with the axis of said rim, and wherein each side wall is substantially deeper than the edges are wide.

5. An assembly according to claim 1 wherein each of said spoke arrangements includes a single rim connecting member connected to and extending between the two spokes of that arrangement in a direction generally normal to a radius of said rim for connecting to said rim and thereby serving as part of said connecting means.

6. A method of making a wheel support assembly adapted to bolt to an axle of a vehicle for supporting a tire, said method comprising the steps of:

(a) providing an outer annular rim having an outer annular surface configured to support a tire;

(b) providing a single piece of sheet metal and stamp forming from the sheet metal as a single integrally formed unit a plurality of spoke arrangements, each of which is formed to include (i) at least two elongated spokes respectively including inner ends and outer ends and (ii) a cross-bar connecting together the inner ends of the spokes and configured to bolt to said axle for connecting the inner ends of said spokes to said axle, whereby to serve as part of a hub of said wheel support assembly, said plurality of spoke arrangements serving as the only spoke arrangements making up said wheel support arrangement and said single integrally formed unit serving as the only strength imparting structure between said rim and the hub; and (c) connecting the outer ends of said spokes to said rim.

7. A wheel support assembly adapted to bolt to an axle of a vehicle for supporting a tire, said assembly comprising:

(a) an outer annular rim having an outer annular surface configured to support a tire and an inner annular surface;

(b) a plurality of spoke arrangements, each of which includes (i) at least two elongated spokes respectively including inner ends and outer ends and (ii) a cross-bar connecting together the inner ends of the spokes and configured to bolt to said axle for connecting the inner ends of said spokes to said axle, whereby said cross-bar serves as part of a hub of said wheel support assembly, said spokes and said cross-bar being integrally stamp formed from a piece of sheet metal, wherein each of said spoke arrangements includes a pair of rim connecting flanges respectively connected to the two spokes of that arrangement in a direction generally normal to a radius of said rim for connecting to said rim and thereby serving as part of said connecting means; and (c) means for connecting the outer ends of said spokes to said rim.

* * * * *